May 23, 1939. R. R. FOX 2,159,691
SIPHONAGE PREVENTER FOR PLUMBING SYSTEMS
Filed Aug. 28, 1937 2 Sheets-Sheet 2
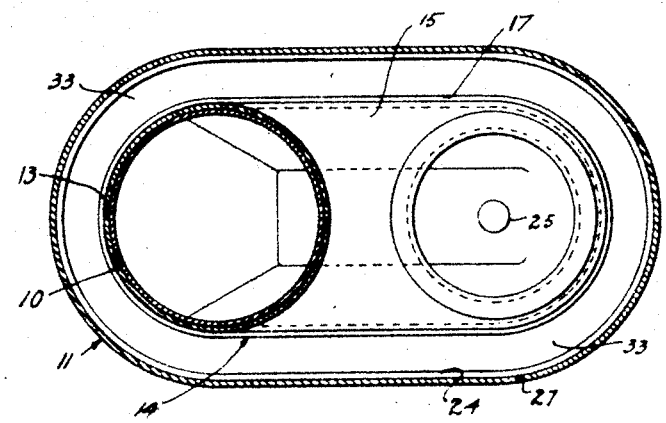
Fig. 5.
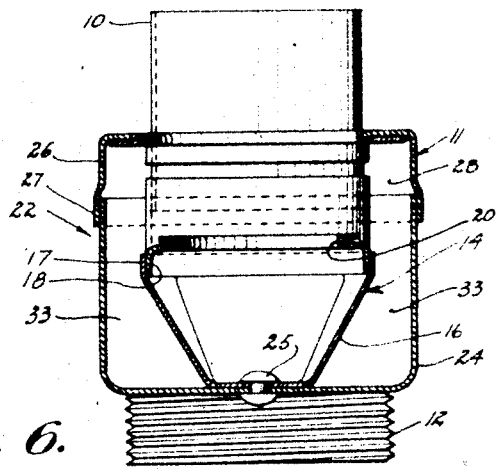
Fig. 6.
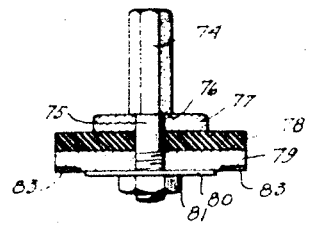
Fig. 7.
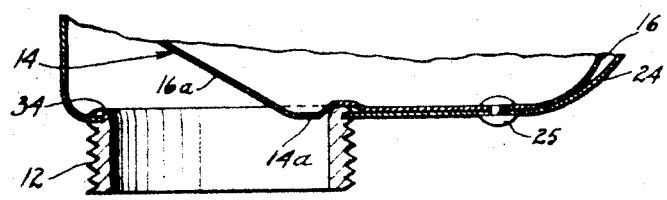
Fig. 8.
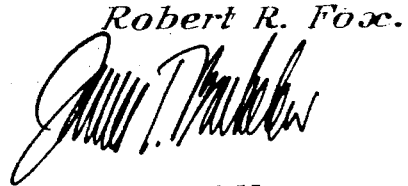
Inventor.
Robert R. Fox.
Attorney.

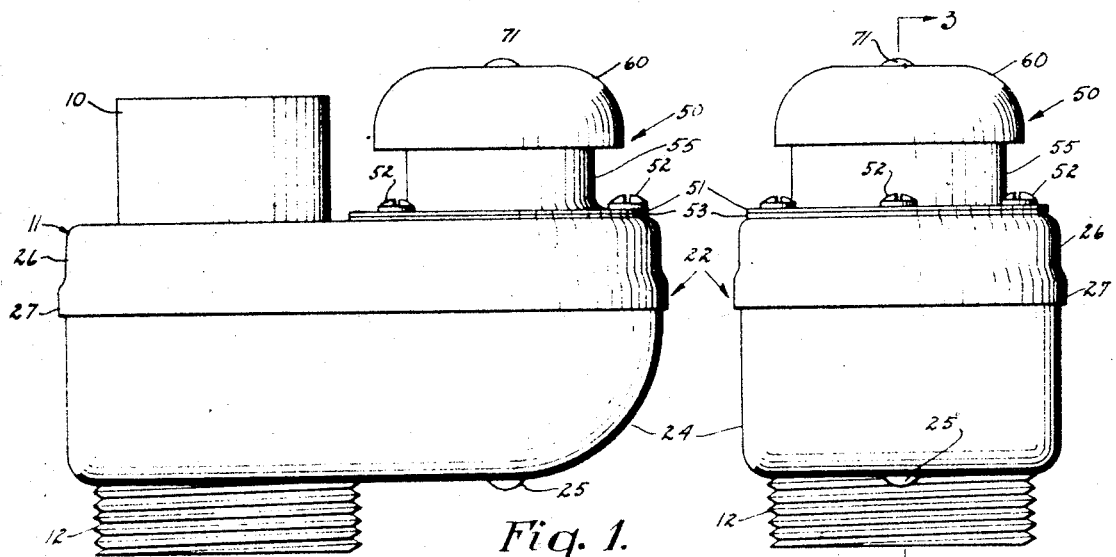
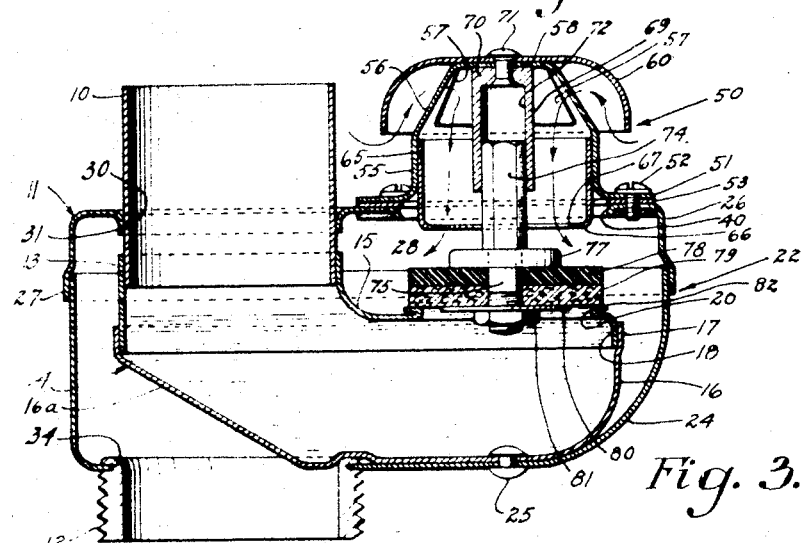
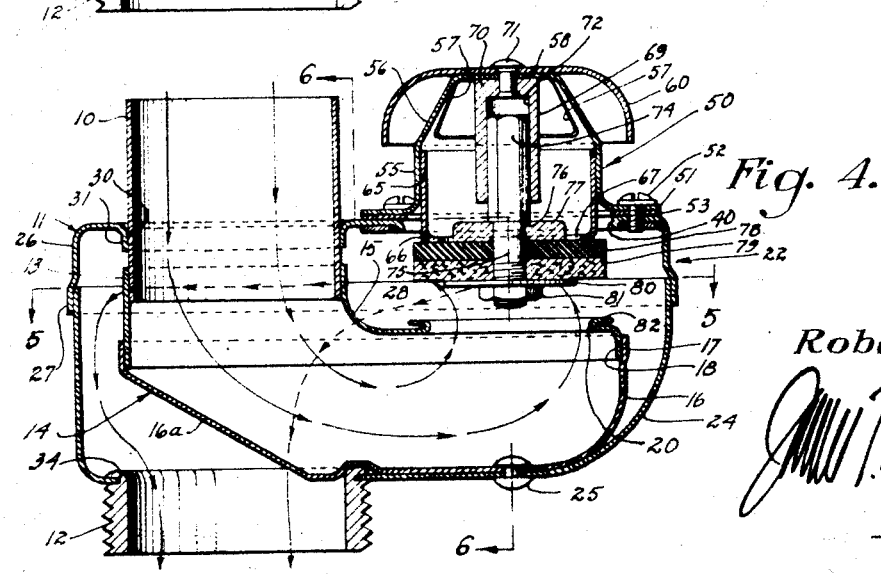

Patented May 23, 1939

2,159,691

UNITED STATES PATENT OFFICE 2,159,691

SIPHONAGE PREVENTER FOR PLUMBING SYSTEMS

Robert R. Fox, Los Angeles, Calif.

Application August 28, 1937, Serial No. 161,450

13 Claims. (Cl. 137—69)

This invention relates generally to devices for preventing back-siphonage of water into water supply lines. The invention is applicable to water supply line outlets generally, though a particular application consists in its installation in connection with flush valves, and the invention will accordingly be herein described with that particular situation chiefly in view, but without necessary limitation thereto.

It is a well known fact that under certain conditions, water may be sucked backwardly through a water outlet into the water supply lines. This may be due to exhaustion of water in the mains, or to reduction of pressure in the main or in the line that supplies the outlet. Assuming the outlet to be connected to a flush valve installed in connection with a toilet bowl, the flush valve normally being held closed by the pressure in the water line, it will be seen that reduction of pressure in the mains may cause an actual suction in the water supply line, and this may cause the flush valve to open, allowing the suction to continue on down into the bowl, and in some instances may lift the water out of the bowl into the water supply line. It will further be evident that a similar occurrence is possible in various situations not involving flush valves; for instance, it is possible for back siphonage to occur in any situation in which the water outlet has access to the water which it has discharged.

It is the primary object of the present invention to provide an improved device for positively preventing such back-siphonage of water into the supply line. A further object of the invention is to provide a siphonage preventer which is not only simple, but rugged and dependable in service, and one which is not liable to become disordered by reason of corrosion.

The particular characteristics of the present invention will best be understood by now referring at once to the following detailed description of a present preferred embodiment thereof, reference for this purpose being had to the accompanying drawings, in which:

Fig. 1 is a side elevation of the device in accordance with the present invention;

Fig. 2 is an end elevation of the device, being a view looking toward the left in Fig. 1;

Fig. 3 is a vertical longitudinal section taken on line 3—3 of Fig. 2, the parts being shown in normal at-rest position;

Fig. 4 is a view similar to Fig. 3 but showing the device in the position taken when flushing discharge is taking place through the device;

Fig. 5 is a section taken on line 5—5 of Fig. 4;

Fig. 6 is a section taken on line 6—6 of Fig. 4; the air chamber and valve being omitted;

Fig. 7 is a detail showing a modified valve structure; and

Fig. 8 is a figure similar to a portion of Fig. 4, showing a modification.

As indicated above, a siphonage preventing device of the instant type may be associated with or incorporated in any conduit wherein liquid normally flows in one direction but wherein reversal of flow due to a vacuum developed ahead of the device would be objectionable. A device of this type is, for instance, adapted to be used with a flush valve, such for example as the valve disclosed in United States Patent No. 2,066,086 to E. C. Wilson, being installed in the flow line between the flush valve outlet and the bowl served by the valve. Thus the vertical inlet tube 10 of the siphonage preventer, which is generally designated by numeral 11, is adapted to be coupled to the discharge outlet of a flush valve, or if the application is one in which a flush valve is not used, it will be understood to be coupled to a water supply line. The exteriorly threaded tubular liquid outlet 12 of the device is adapted to be screwthreadedly connected to the flow line leading to the bowl, or other container supplied by the liquid line.

The lower end of vertical inlet tube 10 communicates with the upwardly extending neck 13 of a conduit 14, which may serve as a water trap member, this conduit having a horizontally extending portion and a return bend leading to an upwardly directed discharge port, as presently to be more particularly described. Conduit or water trap member 14 is here shown as made up of an upper or cover member 15 formed at one end with the described neck 13, and a bottom member 16 provided with an upper vertical rim or flange 17 tightly receiving the lower edge 18 of member 15, as clearly indicated. The upper wall of top member 15 is provided, to one side of inlet 13, with a circular upwardly discharging water outlet opening 20.

Surrounding conduit or trap 14 is an exterior housing 22 made up, in the present form of the invention, of a lower shell 24, the bottom wall of which supports the bottom of member 16, a rivet 25 securing the two together, and an upper closure or cover member 26 having a downwardly extending flange 27 tightly fitted over the upper edge of the side wall of lower housing member 24. This closure member 26 is spaced somewhat above conduit or trap member 14, so as to provide a liquid flow space 28 for water discharged upwardly from outlet 20, and is provided with a circular opening 30 adapted tightly to receive inlet tube 10, said aperture 30 being defined by an inwardly extending annular flange 31 adapted to tightly embrace the inlet tube, so as to prevent escape of water on the outside of said tube. The width of exterior housing 22 is sufficiently greater than the width of trap 14 to provide water flow passages 33 between the walls of the trap and the exterior housing, as shown best in Fig. 6. The lower wall of lower housing member 24 has, substantially alined with inlet tube 10, a circular opening 34 within which the previously mentioned outlet tube 12 is fitted with a water tight joint. The bottom wall portion 16a of lower trap member 16 immediately over outlet opening 34 is elevated to provide a good liquid flow path from around the sides of trap 14 to outlet 12. Thus there is provided a water circulation passage downwardly from inlet tube 10 into trap 14, thence upwardly by way of opening 20 to space 28 within housing 22, and finally around the sides of the trap and downwardly through outlet 12. This liquid flow path is traced by the arrows in Fig. 4.

Upper housing closure member 26 has, alined with circular trap outlet 20, a circular opening 40, and an air inlet member 50 is mounted on the wall of member 26 around this opening 40, being provided at its lower end with an external annular flange 51 supported on member 26 around opening 40 and secured down as by means of screws 52. A water sealing gasket 53 is preferably provided between flange 51 and the housing, as indicated. Chamber 50 has above flange 51 a vertical wall portion 55 merging with a conical wall portion 56 formed with air inlet apertures 57, said portion 56 joining with a horizontal end portion 58. Mounted on end portion 58 is a downwardly turned cup-like member 60, which serves simply to protect air inlet apertures 57 against dirt or small articles entering therethrough. This cup member, while overhanging apertures 57, is annularly spaced therefrom so as to permit free circulation of exterior air underneath the cup and into the device by way of apertures 57.

Tightly mounted within vertical wall portion 55 of chamber 50 is a vertical tube 65 having at its lower end an inwardly turned flange 66 defining an annular passageway 67 and presenting a downwardly facing valve seat, as indicated. Secured to the upper end 58 of member 50 is a tubular valve stem guide 69, the upper end 70 of said guide engaging valve cage end 58 and being secured thereto as by means of rivet 71, the latter also serving to secure cup 60 in assembly with member 50.

In the circular bore 72 of guide 69 slides a hexagonal valve stem 74. The lower end portion 75 of this valve stem is reduced and screwthreaded, as indicated, and mounted on said portion 75 and abutting stem shoulder 76 is a metal washer 77. Below washer 77 is a flexible valve or sealing disc 78, preferably of soft rubber or the like. Immediately below washer 78 is a valve disk 79, preferably formed of fiber, hard rubber, or composition, such as Bakelite. Below and mounted against the lower side of disc 79 is a metal washer 80, and a nut 81 screwthreaded on the lower end of the stem secures members 77 to 80 in assembly.

Valve discs 78 and 79 work between upper valve seat 66 and a lower valve seat 82 formed by beading over the metal around trap opening 20. When the valve assembly is in the position of Fig. 3, valve disc 79 seats on 82, preventing suction developed in the line ahead of inlet 10 from drawing air or water through trap opening 20. The valve assembly is moved from the position of Fig. 3 to the position of Fig. 4 when water flows upwardly from trap opening 20, and in the latter position soft rubber valve disc 78 seats tightly against seat 66 to prevent water from rising within member 50 and escaping through air inlet openings 57.

Provision of the hexagonal valve stem in loosely sliding relation within the cylindrical valve guide bore 72 reduces materially the increased frictional effects of any possible corrosion that might take place between said members. These members, being located in the air chamber above the body, are never in contact with the water flow, and therefore are always dry, so that possibility of corrosion between them is avoided. It will of course be evident that the same advantage could be had by reversing the shapes of the members, providing a cylindrical valve stem within a hexagonal valve guide, and also that various other equivalent cross-sectional shapes will provide the same benefit.

The complete operation of the device may now be understood. Assuming, for illustrative purposes, that inlet 10 is coupled to a usual flush valve, and that outlet 12 is coupled to the line leading to the bowl served by the flush valve, the normal at-rest condition of the device is shown in Fig. 3. It will be noted that the valve assembly is down, with washer 79 resting on valve seat 82, and that water is present in trap 14 up to the level of the lower surface of valve disc 79. This water trapped within member 14 provides a desirable water seal, filtering any air that may under any circumstances be drawn through trap opening 20 due to suction in the supply line. Assuming now that suction should be developed in the supply line, sufficient to cause the flush valve to open, with the result that the suction extends down to and within trap 14, the effect is to cause valve disc 79 to be pressed more tightly onto its seat 82, exterior air entering by way of inlet apertures 57 and circular opening 67 to maintain atmospheric pressure above valve discs 78 and 79 to assure tight seating of lower disc 79. Thus under such circumstances valve disc 79 forms a barrier in the flow line, effectively preventing suction in the line ahead of the flush valve from drawing water from the bowl.

According to a modified form of the invention, a certain air leakage is provided between lower valve disc 79 and its seat. For instance, as indicated in Fig. 7 the underneath surface of valve disc 79 may be provided with small air-passing grooves 83. In such an instance, the operation of the device upon development of suction in the supply line is slightly modified. Valve disc 79 again goes onto seat 82, but the air suction is not entirely blocked by valve disc 79. The suction thus extends beyond valve disc 79, and draws air inwardly by way of air inlet apertures 57 and opening 67. The air so sucked within exterior body 22 satisfies the suction into the trap by way of grooves 83, and so breaks the siphon action, preventing the lift of water from the bowl. It will also be evident that should valve disc 79 become worn or marred, so as to permit some air leakage past it and seat 80, the device will operate as described in the present paragraph.

When the flush-valve is discharging through the device, the water from the flush valve enters by way of tube 10, flows through trap 14 and acts against the lower side of valve disc 79, elevating the valve assembly to the position of Fig. 4. The water so flowing from trap outlet 20 passes around the sides of the trap to reach outlet 12, through which it flows into the discharge line below, the water passing through the device thus flowing in a loop-shaped circulation path. Pressure of the water flowing upwardly from trap outlet 20 holds the upper washer 78 of the valve assembly tightly against upper seat 66, preventing escape of water by way of air inlet ports 57.

In some situations the water trap feature may not be necessary, and as a modification, Fig. 8 shows a form of the invention in which a small bleeder hole 14a is made in the lower end of trap or conduit 14, thus permitting the water which would otherwise be trapped within conduit 14 to drain out. In such a form of the device the operation is substantially as in the case first described, excepting only that a body of water does not collect in conduit 14. For the purpose of certain of the broader claims, therefore, member 14 is referred to as a conduit rather than as a trap.

The device is simple in construction, as well as reliable in service and effectively and positively safeguards against back siphonage. The water trap or seal, which is preferably employed is a feature of advantage which is unique in the device provided by the present invention.

I have now shown and described one specific illustrative form of the invention; it will be understood however that various changes in design, structure and arrangement may be made without departing from the spirit and scope of the invention or of the appended claims.

I claim:

1. In a device of the character described, the combination of a hollow body having a water inlet opening in a top wall thereof and an outlet opening in its lower portion, a water trap spaced within said body and communicating with said inlet, said water trap having an upwardly opening water outlet discharging to the space within said body, an upwardly facing valve seat around said opening, an air inlet passageway in said body terminating in a downwardly opening port located above said trap outlet opening, a downwardly facing valve seat around said port, and a check valve member movable between said seats so as to close either the trap outlet opening or the air inlet passageway, said check valve being adapted to be moved onto its upper seat by virtue of flow of water upwardly from said trap outlet with flushing discharge through the device, and being adapted to seat on its lower seat to form a substantially air tight barrier in the trap outlet opening when suction is applied to the water inlet opening.

2. In a device of the character described, the combination of a hollow body, a water inlet conduit extending through a wall of said hollow body, a trap inside said hollow body comprising walls joining said inlet conduit, said trap extending from said inlet conduit to a position located to one side thereof and opening upwardly at such position to form a water outlet discharging within said body, an upwardly facing valve seat around said opening, said hollow body having in its lower portion a water outlet opening communicating around the outside of said trap with said trap outlet, an air inlet passageway in said body terminating in a port located over said trap outlet opening, a downwardly facing valve seat around said port, and a check valve member movable between said two seats, said check valve member being moved in an upward direction onto its upper seat to close the air admission passageway by virtue of the pressure of the water discharged upwardly from said trap during flushing discharge through the device, and being adapted to seat on its lower seat when flushing discharge ceases, to create a stop against back suction through the trap, and to admit air to the interior of the valve body through said air passageway.

3. In a device of the character described, the combination of a hollow body, a liquid inlet conduit extending downwardly through a top wall of said housing, an inner water chamber joining with and leading from said inlet conduit and terminating in an upwardly opening water outlet opening which is located wholly to one side of said liquid inlet conduit, said body having a liquid outlet communicating with said chamber outlet, an air inlet opening in said body, and check valve means adapted to alternately close said chamber outlet opening and said air inlet opening, said check valve means being movable by pressure of water issuing from said chamber outlet to move to close said air inlet opening during flushing discharge through the device, and being adapted to move to open said air inlet opening and to close said chamber outlet opening between times of flushing discharge.

4. In a device of the character described, the combination of a hollow body, a liquid inlet conduit extending downwardly through a top wall of said housing and communicating with an inner water chamber, said chamber having an upwardly opening water outlet opening within the body at a point laterally offset from said liquid inlet conduit, said body having a water outlet opening, an air inlet opening in said hollow body above said liquid chamber outlet, an air chamber, having an air inlet port, mounted on said body around said air inlet opening, the interior of said air chamber communicating with the hollow body by way of said air inlet opening in the body, an upwardly facing valve seat around said liquid chamber outlet and a downwardly facing seat around the air inlet opening in the body, a check valve member vertically movable between said two seats, a stem on and extending upwardly from said check valve member into said air chamber, and a valve stem supporting member mounted in said air chamber slidably embracing and guiding said valve stem for vertical movement.

5. In a device of the character described, the combination of a hollow body having liquid inlet means extending through its upper face, said inlet means being adapted for attachment to the discharge of a flush valve, or the like, an uninterrupted conduit within the hollow body physically connecting and communicating at one end with said liquid inlet means and having at its other end an upwardly directed discharge port opening within said hollow body, an annular upwardly facing seat around said discharge port, a discharge opening leading from said hollow body adapted for connection with a tubular discharge conduit, an air intake port opening within said hollow body over said conduit discharge port, a downwardly facing annular valve seat around said air intake port located within said hollow body, and a valve movable between said seats, said seats having sufficient space between them to permit said valve to alternately open and close the conduit discharge port and air intake port by vertical movement, said valve being adapted normally to rest by gravity on the seat around said conduit discharge port, whereby said air intake port is maintained normally open, and to be lifted by flow of liquid through said conduit to open said conduit discharge port and close said air intake port.

6. In a device of the character described, the combination of a hollow body having liquid inlet means extending through its upper face, said inlet means being adapted for attachment to the discharge of a flush valve, or the like, an uninterrupted conduit within the hollow body physically connecting and communicating at one end with said liquid inlet means and having at its other end an upwardly directed discharge port opening within said hollow body, an annular upwardly facing seat around said discharge port, a discharge opening leading from said hollow body adapted for connection with a tubular discharge conduit, an air intake port opening within said hollow body over said conduit discharge port, a downwardly facing annular valve seat around said air intake port located within said hollow body, and a valve movably mounted between said seats, said seats having sufficient space between them as to permit said valve to alternately open and close the conduit discharge port and air intake port by vertical movement, said valve being adapted normally to rest by gravity on the seat around said conduit discharge port, whereby said air intake port is maintained normally open, and to be lifted by flow of liquid through said conduit to open said conduit discharge port and close said air intake port, a vertical upwardly extending stem on said valve, and a vertical valve stem guide on said body loosely receiving said valve stem.

7. In a device of the character described, the combination of a hollow body, an inlet opening extending through a top wall of the body, a liquid outlet leading from said body, a liquid conduit within the body communicating with said liquid inlet opening, said conduit having continuous walls leading from said inlet opening to an upwardly opening discharge port adapted to discharge liquid within the hollow body, an upwardly facing valve seat around said discharge port, an air inlet passageway terminating in a port located above said liquid discharge port, a downwardly facing valve seat around said air port, a check valve mounted for movement between said valve seats, and a liquid passage within the body leading from said liquid discharge port to said liquid outlet.

8. In a device of the character described, the combination of a hollow body, an inlet opening extending through a top wall of the body, a liquid outlet leading from the lower portion of said body, a liquid conduit within the body communicating with said liquid inlet opening, said conduit having continuous walls leading from said inlet opening to an upwardly opening discharge port adapted to discharge liquid within the hollow body, an upwardly facing valve seat around said discharge port, an air inlet passageway terminating in a port located above said liquid discharge port, a downwardly facing valve seat around said air port, a check valve mounted for movement between said valve seats, and a liquid passage within the body leading from said liquid discharge port to said liquid outlet.

9. In a device of the character described, the combination of a downwardly leading liquid conduit having a return bend terminating in an upwardly opening liquid port, said conduit being adapted to convey a water stream in uninterrupted columnar form to said port, a valve seat around said liquid discharge port, a hollow body enclosing said return bend and said discharge port, a liquid discharge outlet in the lower portion of said hollow body, there being a liquid passage within said hollow body from the discharge port at the end of said conduit to said liquid discharge outlet in the hollow body, an air inlet port in said body, a valve seat around said air port, and check valve means movable alternately onto said air port seat and said liquid port seat and so mounted as to seat upon said last mentioned seat and close said liquid conduit port when flow of liquid through said conduit ceases, and to be lifted by the flow of water onto its air port seat to close said air inlet port when flow of liquid through said conduit resumes.

10. In a device of the character described, the combination of a water conduit adapted to be connected at its intake end with the discharge outlet of a flush valve, or the like, said conduit having a downwardly leading portion and an upwardly directed return bend having an upwardly opening outlet port causing the water flowing therethrough to reach said port in columnar form and to discharge upwardly, an upwardly facing valve seat around the outlet port of said return bend, a hollow body surrounding said outlet port and said return bend, a water discharge outlet in said hollow body adapted for connection to a discharge conduit, there being a liquid pasageway in said body from said conduit outlet port to said water discharge opening in said body, an air inlet port in said hollow body positioned directly above the valve seat at the discharge end of said water conduit, a downwardly facing valve seat around said air inlet port, a valve mounted for movement between said valve seats, said valve being adapted to rest upon the water port valve seat to close said port when water is not flowing through said conduit, and to be lifted by flow of water from said outlet onto its air port seat to close the air inlet port.

11. In a device of the character described, the combination of a water inlet conduit having a vertical downwardly leading portion formed at its lower end with an upwardly directed return bend terminating in an upwardly opening outlet port, said conduit being adapted to convey a water stream in columnar form to said outlet port, a valve seat around the outlet port of said return bend, a hollow body surrounding said outlet port and said return bend, a downwardly opening water discharge outlet in said hollow body located in vertical alinement with the vertical downwardly leading portion of said water inlet conduit, said last mentioned outlet being adapted for connection with a vertical discharge conduit, there being a liquid passageway in said body from the outlet port of the first mentioned conduit around said conduit to said water outlet in said body, an air inlet port in said body above said valve seat, a valve seat around and controlling said air inlet port, a valve mounted for movement between said valve seats, said valve being adapted to rest upon the water port valve seat to close said port when water is not flowing through said conduit, and to be lifted by flow of water from said outlet onto its air port seat to close the air inlet port.

12. In a device of the character described, the combination of a hollow body, a water inlet extending through an upper wall of said hollow body, walls inside said body forming an interior continuous liquid passage adapted to convey a column of water downwardly from said inlet, then laterally of said inlet, and then upwardly, a water discharge port at the end of said passage located wholly to one side of said inlet, there being a space within said body outside said passage into which the water issuing from said port is received, said body having a water outlet leading from said space, an air inlet opening in said body, and valve means adapted to alternately close said port at the end of said liquid passage and said air inlet opening, said valve means being movable by the column of water issuing from said port to move to close said air inlet opening during flushing discharge through the device, and being adapted to move to open said air inlet opening and to close said water discharge port between times of flushing discharge.

13. In a device of the character described, the combination of a hollow body, a water inlet extending through an upper wall of said hollow body, walls inside said body forming an interior continuous liquid passage adapted to convey a column of water downwardly from said inlet, then laterally of said inlet, and then upwardly, a water discharge port at the end of said passage located wholly to one side of said inlet, there being a space within said body outside said passage into which the water issuing from said port is received, said body having a water outlet leading from said space, an upwardly facing valve seat around and controlling said liquid discharge port, an air inlet opening in said body comprising an air port located over said water discharge port, a downwardly facing valve seat around and controlling said air port, and a valve movable between said seats, said seats having sufficient space between them to permit said valve to alternately seat thereon by vertical movement, said valve being adapted normally to rest by gravity on the seat around said water outlet port, and to be lifted by flow of water from said port to its seat around the air inlet port and thereby close said port, a vertical upwardly extending stem on said valve, and a vertical valve stem guide on said body loosely receiving said valve stem.

ROBERT R. FOX.